United States Patent [19]

Sakiyama et al.

[11] Patent Number: 5,452,402
[45] Date of Patent: Sep. 19, 1995

[54] NEURAL NETWORK CIRCUIT FOR ADAPTIVELY CONTROLLING THE COUPLING OF NEURONS

[75] Inventors: Shiro Sakiyama; Masakatsu Maruyama; Hiroyuki Nakahira, all of Osaka; Toshiyuki Kouda, Nara; Susumu Maruno, Osaka, all of Japan

[73] Assignee: Matsushita Electric Industrial Co., Ltd., Osaka, Japan

[21] Appl. No.: 155,865

[22] Filed: Nov. 23, 1993

[30] Foreign Application Priority Data

Nov. 26, 1992 [JP] Japan .................. 4-316801

[51] Int. Cl.$^6$ .......................... G06F 15/00
[52] U.S. Cl. ........................ 395/27; 395/21; 395/23
[58] Field of Search ............ 395/20, 21, 22, 23, 395/24, 25, 27; 382/15

[56] References Cited

U.S. PATENT DOCUMENTS

| | | | |
|---|---|---|---|
| 5,087,826 | 2/1992 | Holler et al. | 395/24 |
| 5,132,813 | 7/1992 | Caulfield et al. | 395/25 |
| 5,161,203 | 11/1992 | Buckley | 395/20 |
| 5,265,224 | 11/1993 | Maruno | 395/27 |
| 5,280,564 | 1/1994 | Shiomi et al. | 395/27 |
| 5,311,601 | 5/1994 | Carpenter et al. | 395/24 |
| 5,319,587 | 6/1994 | White | 395/27 |
| 5,319,738 | 6/1994 | Shima et al. | 395/27 |

FOREIGN PATENT DOCUMENTS

4-305778  10/1992  Japan .................. G06F 15/70

OTHER PUBLICATIONS

Susumu Maruno, *Multi-Functional Layered Network using Quantizer Neurons*, International Symposium, "Computer World '90," Nov. 7-9, 1990 at 202-209.

*Primary Examiner*—Robert W. Downs
*Assistant Examiner*—Tarig Hafiz
*Attorney, Agent, or Firm*—Willian Brinks Hofer Gilson & Lione

[57] ABSTRACT

In a multi-layered neural network circuit provided with an input layer having input vectors, an intermediate layer having networks in tree-like structure whose outputs are necessarily determined by the values of the input vectors and whose number corresponds to the number of the input vectors of the input layer, and an output layer having plural output units for integrating all outputs of the intermediate layer, provided are learning-time memories for memorizing the numbers of times at learning in paths between the intermediate layer and the respective output units, threshold processing circuits for threshold-processing the outputs of the leaning-time memories, and connection control circuits to be controlled by the outputs of the threshold processing circuits for controlling connection of paths between the intermediate layer and the output units. The outputs of the intermediate layer connected by the connection control circuits are summed in each output unit. Thus, the neural network circuit for recognizing an image or the like can execute recognition and learning of data to be recognized at high speed with small circuit size, and the recognition accuracy for unlearned data is high.

6 Claims, 10 Drawing Sheets

LEARNING-TIME MEMORY
113

LEARNING-TIME MEMORY
113

NEURAL NETWORK CIRCUIT FOR ADAPTIVELY CONTROLLING THE COUPLING OF NEURONS

BACKGROUND OF THE INVENTION

This invention relates to a neural network circuit for executing image recognition processing or the like.

Much interest has recently been shown in a field of neutral network in data processing. The neural network is brought up from simulation of a neuron structure of a brain of a living thing. Many neural networks are accomplished by a conventional yon Neumann sequential computer whose processing speed is extremely low. Therefore, the neural network is now tried to be structured by exclusive electric circuits. There are various kinds of neural network structured by exclusive electric circuits, such as a multi-layered neural network. FIG. 8 shows the multi-layered neural network which has neurons having branch ability and integration ability and is provided with an input layer, an output layer and an intermediate layer of multiple layers interposed therebetween.

The multi-layered neural network shown in FIG. 8 has three layers of: an input layer composed of two neuron elements 111, 112 to which input vectors i=1, i=2 are respectively inputted, an output layer composed of two neuron elements 330, 340 respectively regarding outputs o=1, o=2, and an intermediate layer composed of six neuron elements 121 and an intermediate layer composed of six neuron elements 121–124, 131, 132 Formed in two layers. The intermediate layer is disposed between the input layer and the output layer. Between neuron elements in the respective layers, synapse groups 41–43 are disposed for setting coupling load therebetween. Each coupling load of synapses of the synapse groups 41–43 is changeable by learning.

A neural network agreeing to a recognition object is structured by leaning each coupling load of synapses of the synapse groups 41–43, changing each coupling load sequentially, adequately. As a learning method of each coupling load of synapses of the synapse groups 41–43, a back propagation method (BP method) is generally known in the art, which is much time consuming for learning and additional learning and whose learning algorithm is unsuitable for constructing the hardware.

A neural network circuit shown in FIG. 9 is proposed which is capable of high speed initial learning and additional learning and whose algorithm is suitable for constructing the hardware.

The neural network circuit in FIG. 9 is a neutral network developing the network structure in FIG. 8 into a tree-like branch structure, and is a three-layered neural network provided with an input layer, an intermediate layer and an output layer. The input layer is composed of neuron elements 11—11, 12-11 for only branch operation to which input vectors i=1, i=2 are respectively inputted. The intermediate layer is composed of 24 neuron elements 11-21–11-24, 11-31–11-38, 12-21–12-24, 12-31–12-38 for only branch operation which are formed in two layers, and has networks 13-1, 13-2 in tree-like branch structure in number of input vectors i=1, i=2 of the input layer (i.e., two). The output layer is composed of two output neuron elements (output units) 310, 320 for only integration operation, which respectively regard outputs o=1, o=2, and sums outputs from the upper 16 neuron elements 11-31–11-38, 12-31–12-38 of the intermediate layer. Between the intermediate layer and the output layer a synapse group 4 is disposed for setting respective coupling loads between the neuron elements. The coupling loads of each synapse of the synapse group 4 are changeable by learning. In FIG. 9, paths through 12-11–12-22–12-34–310 corresponds to paths through 112 - 122 - 132 - 330 in FIG. 8. Wherein, each coupling load of synapse between the neuron elements 11-11–11-38 and each coupling load of synapse between the neuron elements 12-11–12-38 are not learned and are set necessarily according to a value of the input vector inputted into the respective neuron elements 11-11, 12-11 of the input layer.

As an example of network system which depends on only the value of the input vector and sets necessarily, without learning, the coupling load of synapse in three-like branch structure, such as shown in FIG. 9, there is a network system called quantizer neuron which is disclosed in "Character Recognition System Using Network Comprising Layers By Function", Preliminary Material for Image Electronic Communication Society's National Conference 1990, pages 77–80 and "Multi-Functional Layered Network using Quantizer Neurons", Computer World '90, November. In this kind of network structure, the coupling loads of synapses of a final layer is changed independent form other synapses, which leads to high speed initial learning and additional learning and makes the learning algorithm suitable for constructing the hardware.

In the recognition method in the network system shown in FIG. 9, output values of the two neuron elements 310, 320 for only integration operation which are provided at an output layer are judged as to which is the largest and the address of the neuron element whose output value is the largest is made a recognition result. In the integration method in the neuron elements 310, 320 of the final layer for integrating outputs of the neuron elements 11-31–11-38, 12-31–12-38 of the intermediate layer, the respective output values of the intermediate layer and the respective coupling loads set in the synapse group 4 are multiplied and summed for integration.

The integration method in neuron elements are explained, with reference to FIG. 10.

In FIG. 10, the output neuron elements 310, 320 and the synapse group 4 are identical with those in FIG. 9. References f1 and f2 denote intermediate output values of the neuron elements 11-31, 11-32 in FIG. 9 respectively. In accordance with the above-mentioned references, the neuron elements 11-31–12-38 are branch points of an input signal, so that an output value from the neuron element 11-31 to the output neuron element 310 and an output value from the neuron element 11-31 to the output neuron element 320 are equal to each other and are indicated by f1. Respective coupling load calculations of synapses to the output neuron elements are executed by respective coupling calculation executing parts 4-11–4-22. The coupling load calculation executing part 4-11 is composed of a multiplier 112 and a coupling load coefficient W11 which is multiplied with the output value f1 corresponding to the intermediate layer to output a multiplied result. The coupling load calculation executing parts 4-12–4-22 have the same function as the coupling load calculation executing part 4-11, and have a different coupling load coefficient from one another. The integration calculations in the output neuron elements 310, 320 are expressed in following respective equations. The thus integrated output values of the neuron elements 310, 320 are judged as to which is the largest, and an address of the neuron element whose output value is the largest is made a recognition result.

output of output neuron element $310 = W11 \times f1 + W12 \times f2 + \ldots$ output of output neuron element $320 = W21 \times f1 + W22 \times f2 + \ldots$ The learning algorithm in network system shown in FIG. 9 uses the learning rule of Hebb, in which if the recognition result is false, the coupling load of the synapse group 4 to an output neuron element to be true is fortified until the value of the output neuron element to be true is the largest output value by a supervisor input in FIG. 9. As to the fortifying method, the coupling load coefficient is added according to the output value of the neuron elements 11-31–11-38, 12-31–12-38.

The fortifying method of coupling load of the synapse is explained, with reference to FIG. 11.

FIG.11 shows the coupling load W11 of FIG. 10 in enlarged scale. The intermediate layer output f1 is added to the present coupling load W11 according to a learning signal. The change in coupling load by learning is expressed as follows:

$$W11 = W11 + f1$$

In the multi-layered neural network structure which has the intermediate layer of tree-like branch structure, executes integration of synapses by output neuron elements of the final layer and executes learning by changing the coupling loads of the synapses of the final layer, the coupling load change is executed independent from the other synapses, which leads to high speed initial learning and additional learning and makes the learning algorithm suitable for constructing the hardware.

Recognition accuracy in the above multi-layered neural network of tree-like brunch structure is, however, low in case where a new unlearned data is recognized after an initial learning. The inventors have studied the reasons and consider the following is one of the reasons: in case where some kinds of input data are all identified by learning in the above neural network and variance of one kind of input data is small, a coupling load of the synapse group to the output neuron elements for recognizing a data similar to the input data is inflated at learning of the similar data so as to clarify a difference between the similar data and the one-kind input data, with a result that the similar data is misrecognized as an output result of output neuron element having as an input the inflated coupling load at next recognition of an unlearned data different from the similar data under such a condition since the inflated coupling load is extremely large compared with the other coupling loads of the unlearned data when the synapse group of the inflated coupling load is included in the synapse group to the output neuron element for the unlearned data recognition.

At the initial learning, the coupling load of synapse to the output neuron element is gradually increased according to the number of times at learning, which requires bit accuracy (bit word length) of coupling load and increases hardware in size which is required for coupling load memory. The above-mentioned references disclose that the coupling load memory of about 16 bits is required for 13-font learning of 62 kinds of character data according to a data group to be recognized. This means a large-sized hardware required for the coupling load memory.

SUMMARY OF THE INVENTION

This invention has its objects of providing a neural network circuit capable of solving the problems in the neural network of tree-like branch structure, of improving a recognition accuracy for unlearned data and of reducing hardware size required for coupling load memory.

To attain the above object, in the present invention, connection of the synapses to the output neuron elements is controlled by learning, different from the conventional one that the synapses are connected to the output neuron elements by weight of coupling load.

In detail, in the present invention, a multi-layered neural network circuit provided with an input layer having one or plural input vectors, an intermediate layer having networks in tree-like structure whose outputs are necessarily determined by values of the input vectors and whose number corresponds to the number of the input vectors of the input layer, and an output layer having one or plural output units for integrating all outputs of the intermediate layer, comprises: learning-time memories for respectively memorizing a number of times at learning in paths between the intermediate layer and the respective output units; threshold processing circuits for respectively threshold-processing an output of the respective leaning-time memories; and connection control circuits for respectively controlling connection and disconnection of the paths between the intermediate layer and the respective output units according to an output of the respective threshold processing circuits, wherein the respective output units sum the outputs of the intermediate layer connected by the respective connection control circuits.

The neural network circuit further comprises upper limit clipping means for respectively clipping the number of times at learning stored in the respective learning-time memories to a set upper limit.

The neural network circuit further comprises: learning-time updaters for respectively subtracting a set value from the number of times at learning stored in the respective learning-time memories; and lower limit clipping means for respectively clipping an updated result of the number of times at learning which is less than 0 to 0.

In the present invention, another multi-layered neural network circuit provided with an input layer having one or plural input vectors, an intermediate layer having networks in tree-like structure whose outputs are necessarily determined by values of the input vectors and whose number corresponds to the number of the input vectors of the input layer, and an output layer having one or plural output units for integrating all outputs of the intermediate layer, comprises: flag memories for respectively memorizing whether paths between the intermediate layer and the respective output units are learned in a past learning; and connection control circuits for respectively controlling connection and disconnection of the paths between the intermediate layer and the respective output units according to an output of the respective flag memories, wherein the respective output units sum the outputs of the intermediate layer connected by the respective connection control circuits.

In the neural network circuit, each output of the intermediate layer has two kinds of values of "HIGH"

and "LOW", and the respective output units count the number of "HIGH"s among the outputs of the intermediate layer connected by the respective connection control circuits.

According to the neural network circuit with the above construction, the number of times at learning of synapses to the output neuron elements is memorized in the learning-time memory, and only paths between the outputs whose numbers of times at learning (number of times that non-zero values are outputted or number of times that each of the outputs exceeds the set value in each output of the intermediate layer of network in tree-like branch structure) exceed the set threshold among outputs of the networks and the respective output units are connected by the connection control circuit only when the number of times at learning exceeds the set threshold. As a result, each output unit executes summation of all outputs of the connected intermediated layer to recognize the input data. The input data recognition depends on the path connection between the outputs whose numbers of times at learning exceed the set threshold among the outputs of the intermediate layer and the respective output units. Since there presents no weight in the connected paths, the local inflation in coupling load of synapse as the conventional one does not occur, thus enhancing the recognition accuracy for unlearned data.

By clipping the number of times at learning in the learning-time memory to the upper limit value, the hardware size required for memorizing the number of times at learning is reduced.

Many paths among paths between outputs of the intermediate layer and the output units are connected unnecessarily owing to excessive learning. However, the unnecessary paths are disconnected so as to connect only the necessary paths by subtracting the set value from each number of times at learning in all learning-time memory or by increasing the threshold of the threshold processing circuit by the set value. Thus, noise component of data to be recognized at excessive learning is reduced, while further enhancing the recognition accuracy for unlearned data.

Moreover, in the present invention, instead of learning-time memory, the flag memory is provided for memorizing the presence of learning history of synapse to the output neuron element, which further reduces the hardware in size.

Instead of summation of output values of the intermediate layer by the respective output units of the output layer, the number of times that outputs of non-zero value among outputs of the intermediate layer are outputted are counted, which further reduces the hardware size of the integration circuit including the output layer.

Other and further object and novel features of the present invention will appear more fully from the following description with accompanying drawings.

BRIEF DESCRIPTION OF THE ACCOMPANYING DRAWINGS

Accompanying drawings show preferable embodiments of the present invention, in which.

DETAILED DESCRIPTION OF PREFERRED EMBODIMENTS

Description is made below about preferred embodiments of the present invention, with reference to accompanying drawings.

Figure 1:
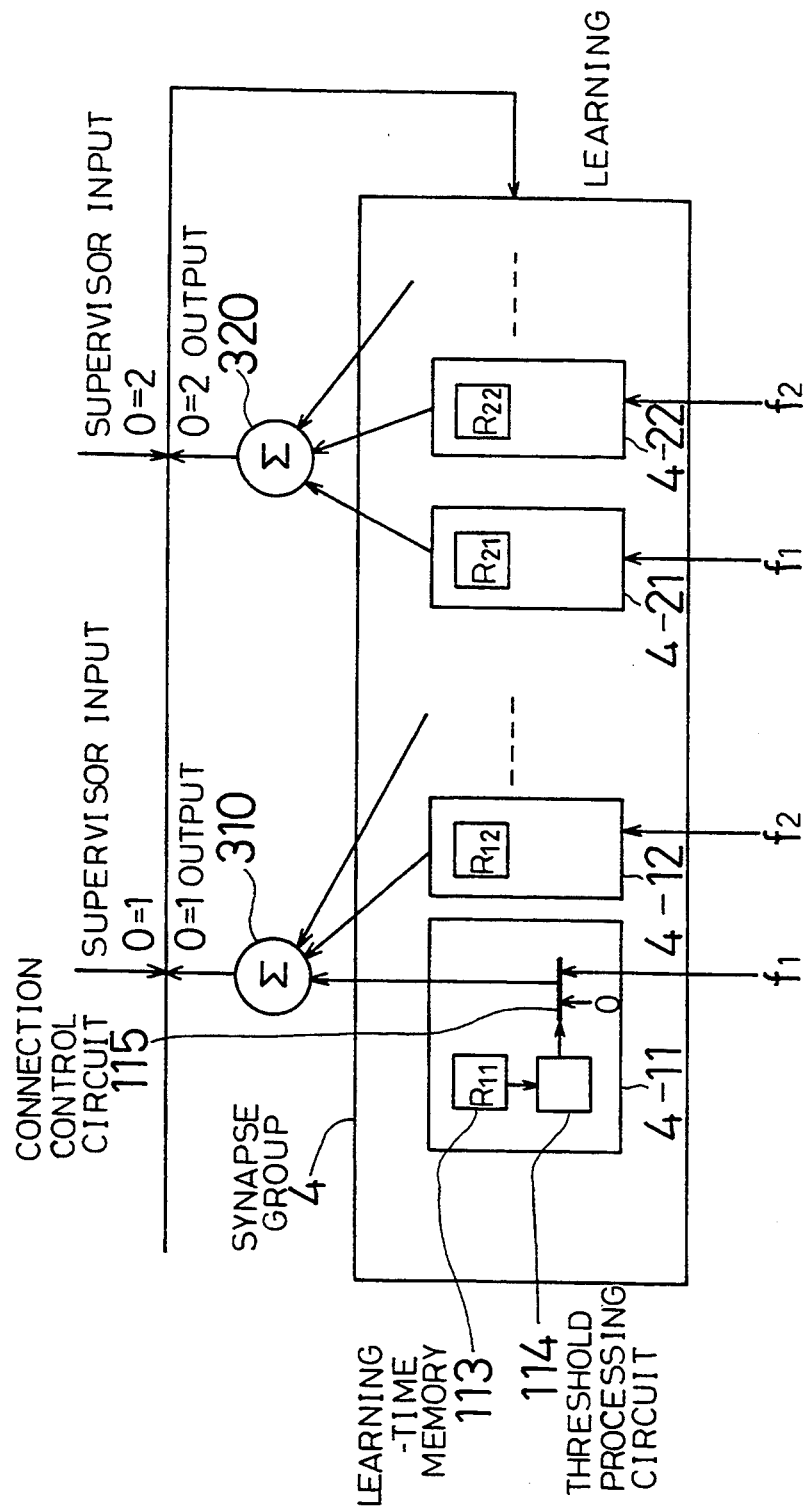
FIG. 1 is a diagram showing a construction of a neural network circuit in a first embodiment.
Figure 10:
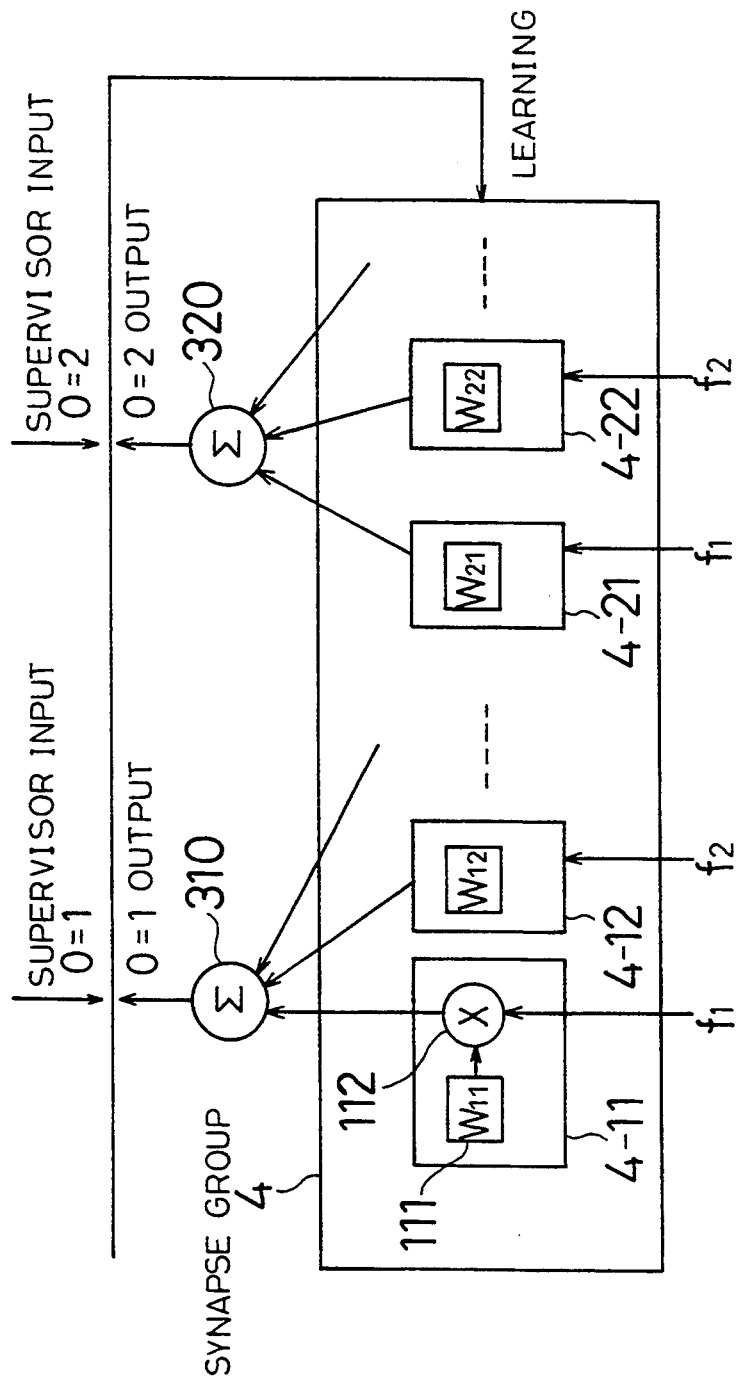
FIG. 10 is a diagram for explaining an integration method of integral neuron elements in the conventional multi-layered neural network circuit in tree-like branch structure.
Figure 11:
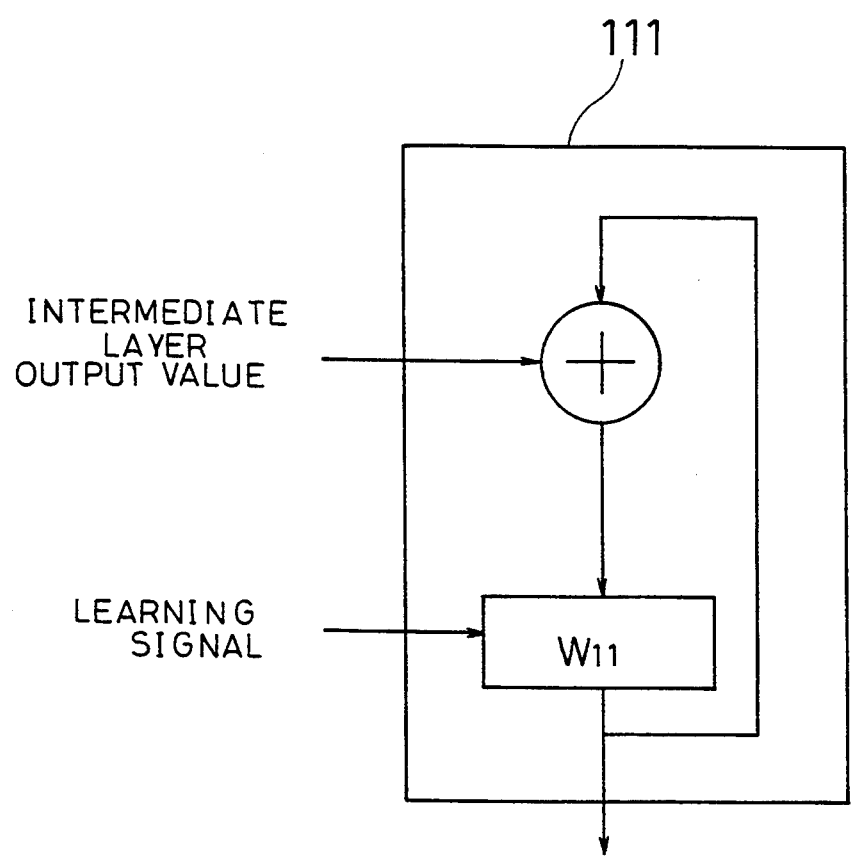
FIG. 11 is a diagram of a conventional coupling load calculation circuit of a coupling load memory.

FIG. 1 shows a construction of a neural network circuit, and corresponds to the conventional example in FIG. 10. As far as is possible the same reference numerals have been used as in FIG. 10.

Figure 9:
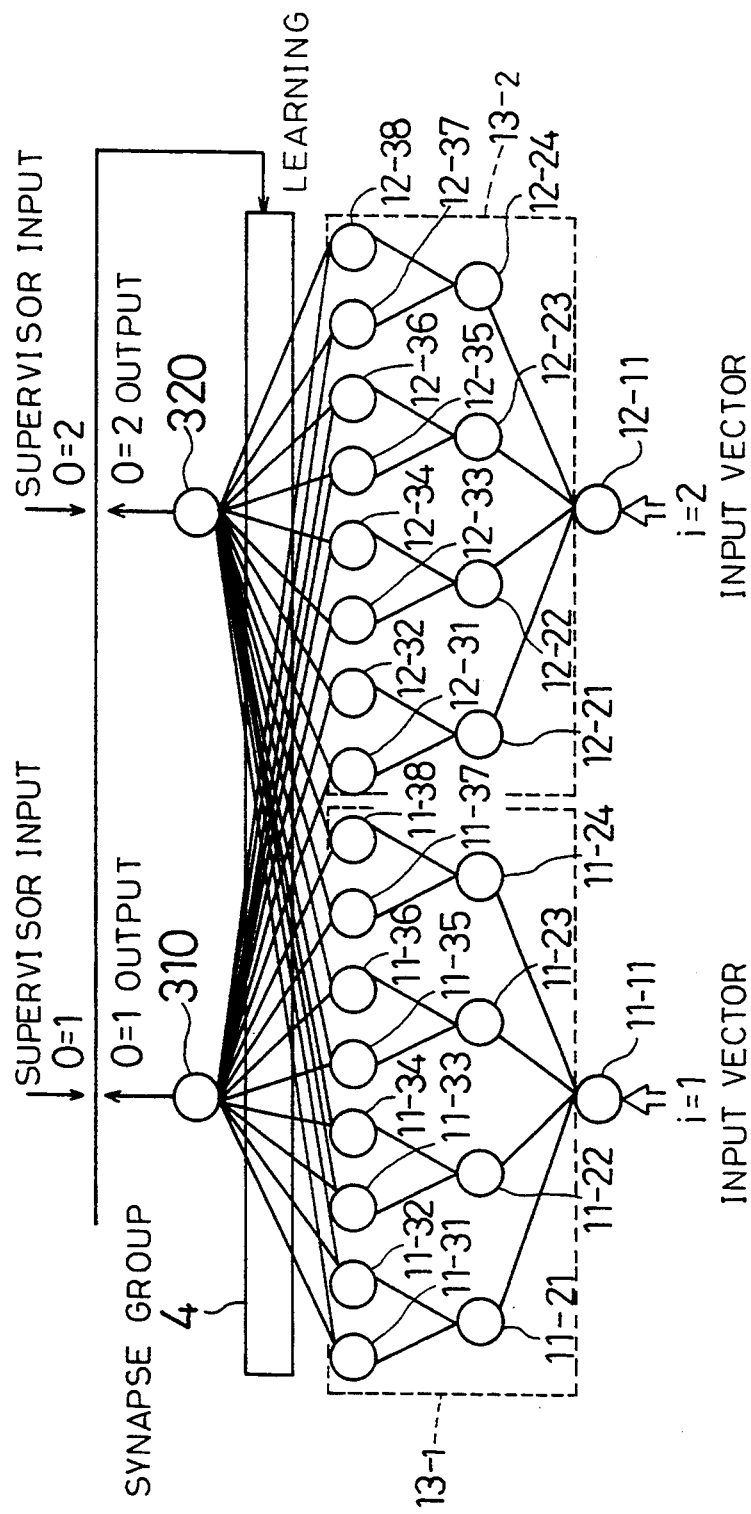
FIG. 9 is a diagram showing a construction of a conventional multi-layered network circuit in tree-like branch structure.

In FIG. 1, reference numerals 310 and 320 are output neuron elements of a final layer for integrating intermediate layer outputs of neuron elements 11-31–11-38, 12-31–12-38 in FIG. 9. References f1 and f2 are, as mentioned in the conventional example, intermediate layer output values of neuron elements 11-31 and 11-32 in FIG. 9 respectively. In accordance with the above mentioned references, the neuron elements 11-31–12-38 are branch points of an input signal, so that an output value from the neuron element 11-31 to the output neuron element 310 and an output value from the neuron element 11-31 to the output neuron element 320 are equal to each other and are indicated by f1. The calculation of connection of synapse to the output neuron elements is executed by connection calculation executing parts 4-11–4-22.

The connection calculation executing part 4-11 is composed of a learning-time memory 113, a threshold processing circuit 114 for threshold-processing the learning-time memory 113, namely for comparing the number of times at learning stored in the corresponding learning-time memory 113 with a set threshold and for outputting a set value when the number of times at learning of the corresponding learning-time memory is equal to or more than the threshold and outputting another set value when the number of times at learning of the corresponding learning-time memory is less than the threshold, and a connection control circuit 115 controlled by two kinds of control signals from the threshold processing circuit 114. The connection control circuit 115 controls connection of synapse between the intermediate layer and the output neuron elements. The connection calculation executing parts 4-12–4-22 have the same function as of the connection calculation executing part 4-11, and have a different number of times at learning from one another. If the threshold of the threshold processing circuit 114 is 1, the intermediate layer output f1 is outputted when the learning-time value R11 (the number of times at learning) of the learning-time memory 113 in the connection calculation executing part 4-11 is 1 or more and 0 is outputted without connection of the intermediate layer output f1 when the learning-time value R11 of the learning-time memory 113 is 0. In the output neuron elements 310, 320, only the intermediate layer outputs of connected synapses are added for integration among the intermediate layer outputs.

The thus integrated output values of the output neuron elements 310, 320 are judged as to which is the largest so as to make an address of the output neuron element whose output value is the largest a recognition result.

Learning algorithm in the network system shown in FIG. 1 is discussed next.

First, all learning-time memories of synapses continuing to the output neuron elements are set 0. Then, an initial learning is executed only one time to all data to be initial-learned. The learning method is that: the values in all learning-time memories of synapses whose intermediate layer outputs are not 0 are incremented by a supervisor input in FIG. 1 among the synapses connected to the output neuron elements corresponding to the input data. It may be possible to increment the values in the learning-time memories of synapses whose intermediate layer outputs are equal to or more than a threshold.

Figure 2:
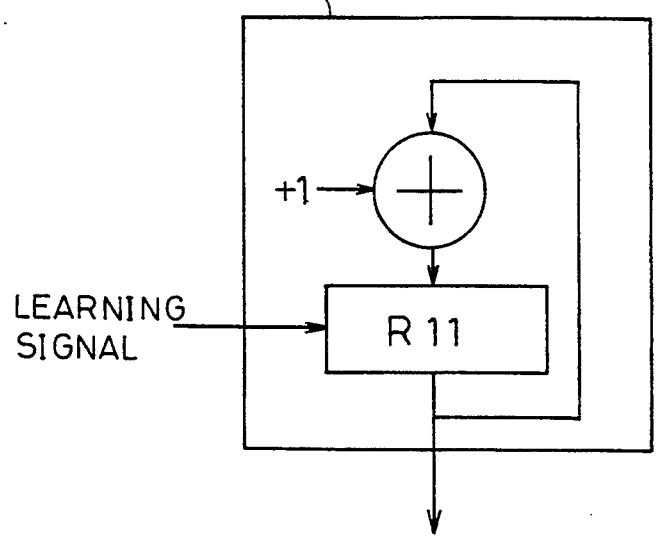
FIG. 2 is a diagram of a learning calculation circuit of a learning-time memory.

FIG. 2 shows an example of an updater of the learning-time memory 113 in FIG. 1 in enlarged scale. The present learning-time value R11 is incremented by 1 according to a learning signal. Change in number of times at learning by learning is expressed in a following equation:

$$R11 = R11 + 1$$

As described above, in this embodiment, the number of times at learning of synapse to the output neuron elements is memorized, and only the intermediate layer outputs from synapses whose numbers of times at learning exceed the threshold are summed. Thus, the local inflation in coupling load of synapse due to small variance of one kind input data in addition to similar data is prevented and the recognition accuracy for unlearned data is enhanced.

Figure 3:
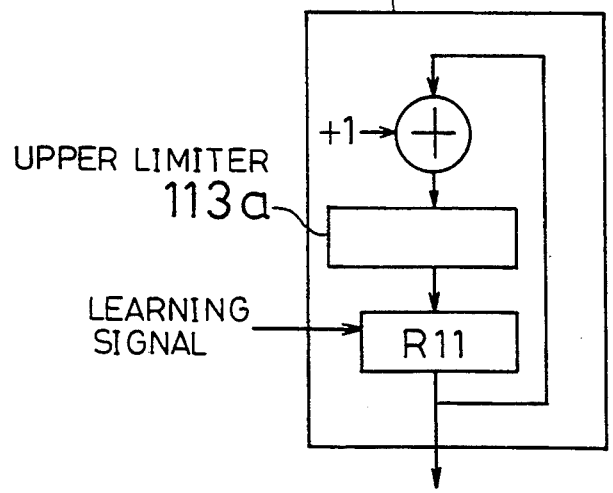
FIG. 3 is a diagram of a leaning calculation circuit showing a first modified example of learning-time memory.

FIG. 3 shows a modified example of a learning calculation circuit of the learning-time memory 113. As shown in FIG. 3, an upper limiter 113 as upper limit clipping means is provided on the input side of the learning-time memory 113. This reduces a memory capacity of the learning-time memory 113. Different from the conventional construction that the synapse to the output neuron elements is connected by weight of coupling load, in the present invention, the connection of synapse to the output neuron elements is controlled according to the number of times at learning.

When a limit value (upper limit of the number of times at learning) of the upper limiter 113a shown in FIG. 3 is set to 3, only two bits are required for memorizing the number of times at learning, which is one eighth of 16-bit coupling load memory in the conventional one. Further, the recognition accuracy is increased to about 86% (63% in the conventional one) in a recognition test for unlearned data after the initial learning according to the present invention with the neural network construction in the above mentioned references. In the recognition test, 62 kinds of 13-font character data are learned at the initial learning and the recognition accuracy for 62 kinds of 10-font unlearned character data is calculated.

According to the present invention, the recognition accuracy for unlearned data is excellent even with less memory capacity required for learning.

According to the neural network circuit with the above construction, one-time learning to one input data makes the value of the corresponding output neuron element the largest for the same input data without exception, thus enabling the initial learning without recognition result with no conditions. Accordingly, the convergence time at the initial learning in the neural network construction in the present invention is about one sixtieth to one thousandth of that in the conventional one.

While the learning-time memory 113 in FIG. 3 has excellent feature, a problem arises that the recognition accuracy for unlearned data is lowered owing to excessive learning. Because, the synapses to the output neuron elements are unnecessarily connected, receiving many noise components by excessive learning. However, the lowering of the recognition accuracy for unlearned data due to excessive learning is prevented by regarding the synapses which are not so learned in past learning as noise components and ignoring the learning history.

Figure 4:
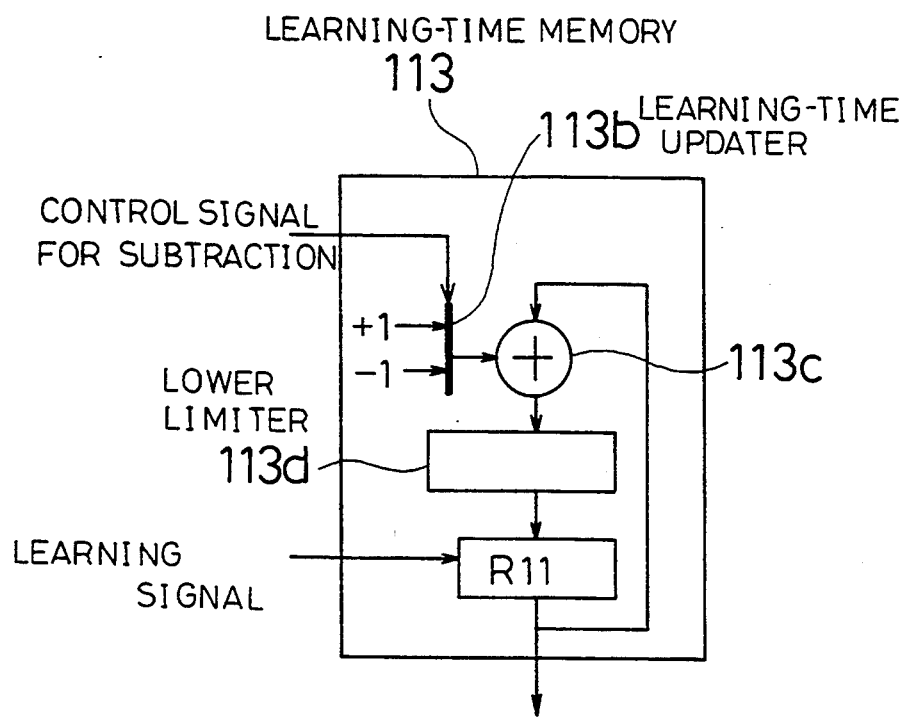
FIG. 4 is a diagram of a learning calculation circuit showing a second modified example of learning-time memory.

FIG. 4 shows an example of an updater of the learning-time memory which solves the problem which is another modification of the learning-time memory 113 in FIG. 1. The learning-time memory in FIG. 4 includes a selector 113b as a learning-time updater having a function of decrementing by one the present learning-time value R11 according to a learning signal, in addition to the incrementing function shown in FIG. 2. The selector 113b receives a control signal for subtraction. When the control signal for subtraction is inputted, the selector 113b outputs −1 to an adder 113c, halting the incrementing function, to decrement by 1 the present learning-time value R11. Further, the learning-time memory includes a lower limiter 113d as lower limit clipping means which has a function of limiting a value less than 0 to 0.

When the recognition accuracy for unlearned data is lowered due to excessive learning, 1 is subtracted from all learning-time values stored in the learning-time memories of the synapses to the output neuron elements according to the control signal for subtraction. Wherein, the learning-time value R11 less than 0 is limited to 0 by the lower limiter 113d. With the above function added, the lowering of the recognition accuracy for unlearned data due to excessive learning is prevented.

As to means for preventing the lowering of the recognition accuracy for unlearned data due to excessive learning, the same effect can be obtained by adding 1 to the threshold of the threshold processing circuit 114 in FIG. 1, besides the method showing in FIG. 4.

The updater of the learning-time memory subtracts 1 in this embodiment, but may execute division if it has the function of decreasing the number of times at learning.

Figure 5:
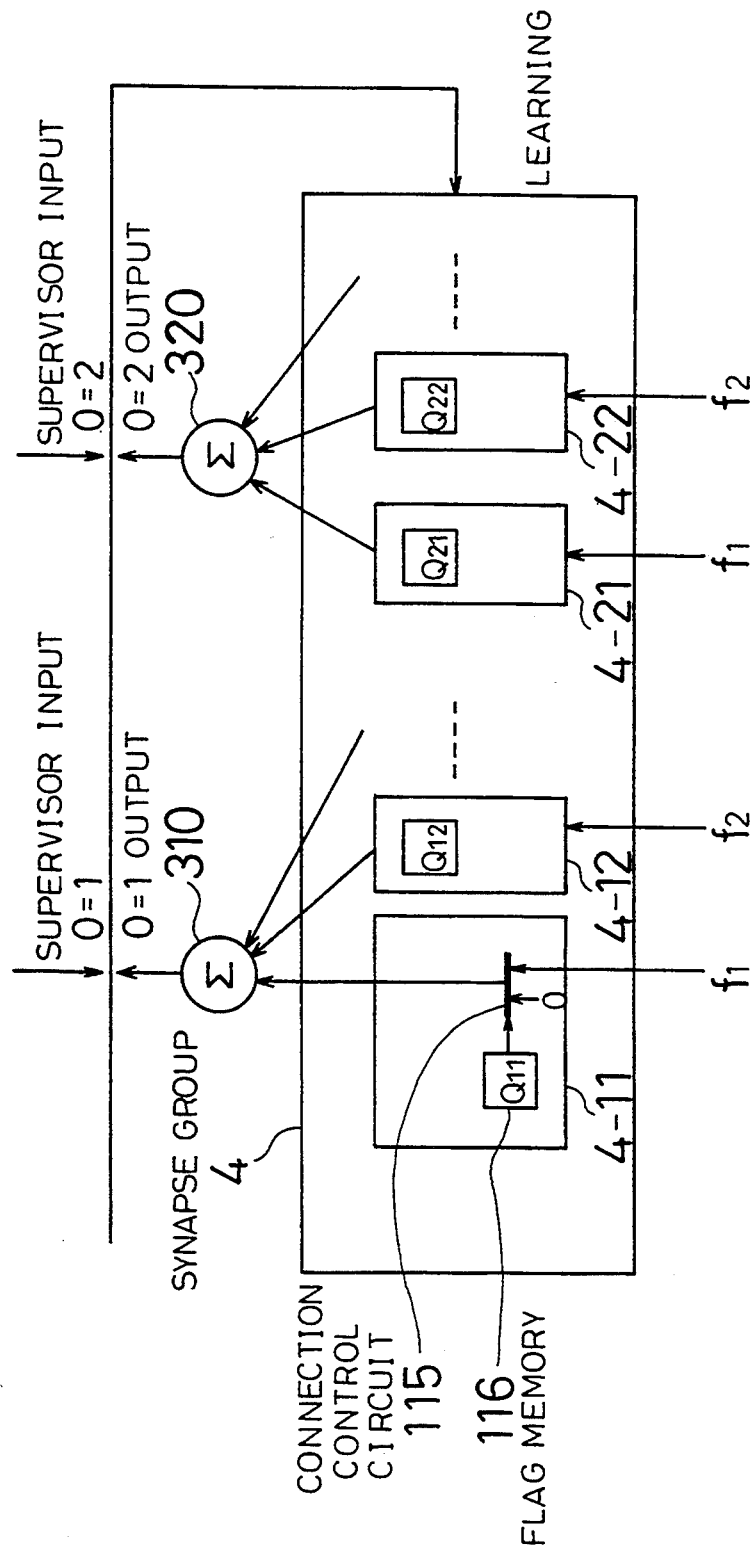
FIG. 5 is a diagram showing a construction of a neural network circuit in a second embodiment.

FIG. 5 shows a construction of a neural network circuit in a second embodiment, and corresponds to FIG. 10 of the conventional example, so the same reference numerals as in FIG. 10 have been used for the same elements in FIG. 5.

In FIG. 5, reference numerals 310 and 320 are output neuron elements of the final layer for integrating intermediate layer outputs of the neuron elements 11-31–11-38, 12-31–12-38. References f1 and f2 are, as mentioned in the conventional example, the intermediate layer output values of the neuron elements 11-31 and 11-32 in FIG. 9 respectively. In accordance with the above mentioned references, the neuron elements 11-31–12-38 are branch points of an input signal, so that an output value from the neuron element 11-31 to the output neuron element 310 and an output value from the neuron element 11-31 to the output neuron element 320 are equal to each other and are indicated by f1. The calculation of connection of synapse to the respective output neuron elements is executed by the connection calculation executing parts 4-11–4-22.

The connection calculation executing part 4-11 is composed of a flag memory 116 and a connection control circuit 115 to be controlled by the flag memory 116 for controlling connection of synapse between the intermediate layer and the output neuron elements. The connection calculation executing parts 4-12–4-22 have the same function as that of the connection calculation executing part 4-11, and have a different flag value from one another. The intermediate layer output f1 is outputted when a value Q11 of the flag memory 116 in the connection calculation executing part 4-11 is 1 and 0 is outputted without connection of the intermediate layer output f1 when the value Q11 of flag memory 116 is 0. In the output neuron elements 310, 320, only the intermediate layer outputs of connected synapses are added for integration among the intermediate layer outputs. The thus integrated output values of the neuron elements 310, 320 are judged as to which is the largest so as to make an address of the output neuron element whose output value is the largest a recognition result.

The learning algorithm in the network system shown in FIG. 5 is discussed next.

First, all flag memories of synapses continuing to the output neuron elements are set to 0. Suppose that the intermediate layer output is not connected to the output neuron elements when the flag memory is 0 and is connected thereto when the flag memory is 1. Then, at the initial learning, learning is executed only one time to all of the data to be initial-learned. The learning method is that: 1 is set by a supervisor input in FIG. 5 to all values in the flag memories of synapses whose intermediate layer outputs are not 0 among the synapses connected to the output neuron elements corresponding to the input data. Setting to 1 may be conducted to the flag memories whose intermediate layer output is equal to or more than a set threshold, instead of non-zero intermediate layer value.

As described above, in this embodiment, the flag memory requires only one-bit memory capacity for one synapse, which means further reduction of memory capacity than in the first embodiment. Since the threshold processing circuit for the learning-time memory is unnecessary, the size of the hardware is expected to reduce. As to the recognition accuracy for unlearned data, the equivalent performance is obtained as in the neural network circuit in the first embodiment.

According to the present invention, the recognition accuracy for unlearned data is excellent even with less memory capacity of the flag memory which is required for learning.

Further, in the neural network circuit with the above construction, one-time learning to one input data makes the value of the corresponding output neuron element the largest for the same input data without exception, which enables the initial learning without recognition result with no conditions. Accordingly, the convergence time at the initial learning in the neural network construction in the present invention is about one sixtieth to one thousandth of that in the conventional one.

In the neural network circuit in this embodiment, the recognition accuracy for unlearned data is lowered because of excessive learning. However, such the low recognition accuracy can be ignored in cases of initial learning not to be excessive learning, of learning of data with less noise component or of use of the flag memory in ROM construction as recognition device.

Figure 6:
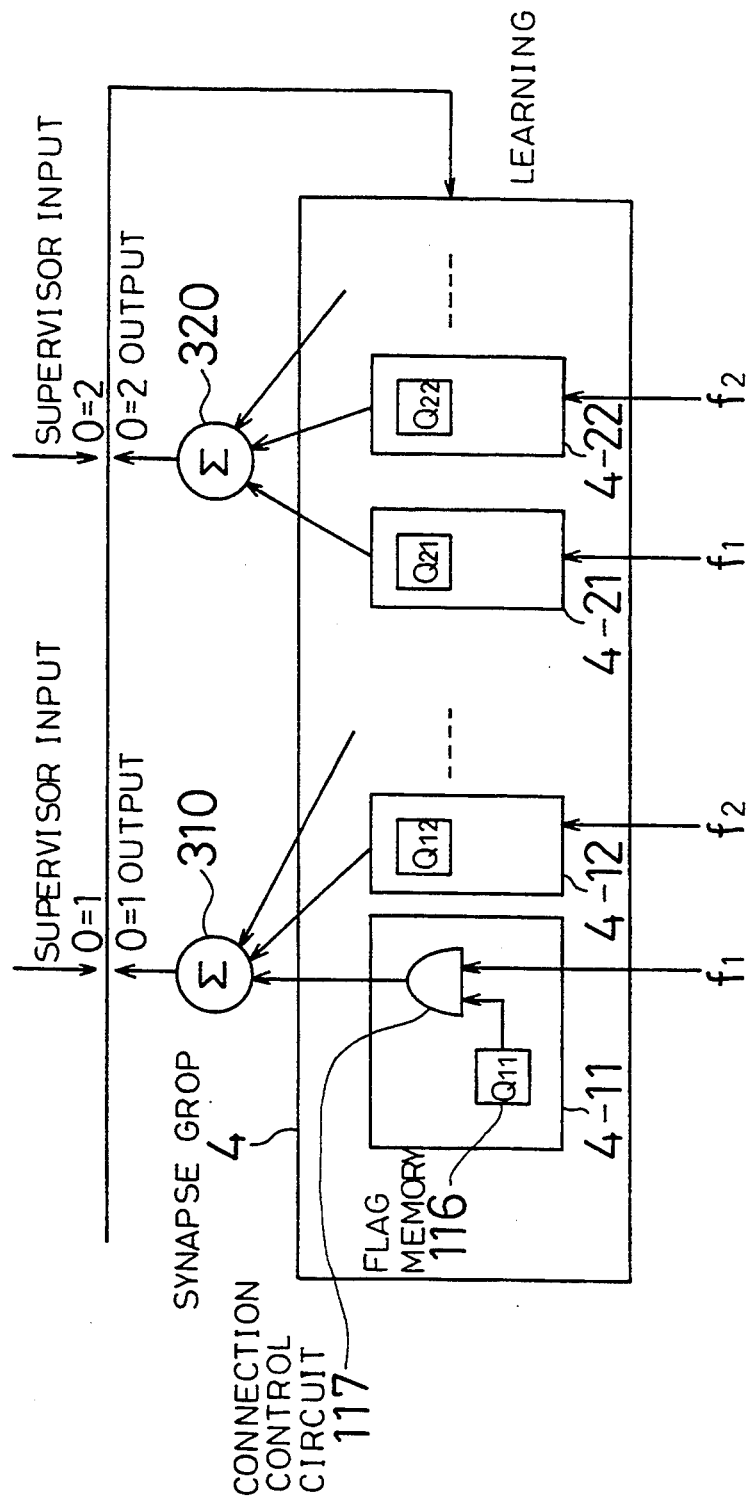
FIG. 6 is a diagram showing a construction of a neural network circuit in a third embodiment.

FIG. 6 shows a neural network circuit according to a third embediment, and corresponds to FIG. 5 of the conventional example, so the same reference numerals as in FIG. 5 have been used for the same elements in FIG. 6.

In FIG. 6, reference numerals 310 and 320 are the output neuron elements of the final layer for integrating intermediate layer outputs of the neuron elements 11-31–11-38, 12-31–12-38. References f1 and f2 are, as described in the conventional example, the intermediate layer output values of the neuron elements 11-31 and 11-32 in FIG. 9 respectively. In accordance with the above mentioned references, the neuron elements 11-31–12-38 are the branch points of an input signal, so that an the output value from the neuron element 11-31 to the output neuron element 310 and an output value from the neuron element 11-31 to the output neuron element 320 are equal to each other and are indicated by f1. Wherein, in FIG. 6, there are two kinds, i.e. 1 and 0, of intermediate layer output values f1, f2. The calculation of connection of synapse to the respective output neuron elements is executed by the connection calculation executing parts 4-11–4-22.

The connection calculation executing part 4-11 is composed of the flag memory 116 and a connection control circuit 117 to be controlled by the flag memory 116 for controlling the connection of synapse between the intermediate layer and the output neuron elements. The connection calculation executing parts 4-12–4-22 have the same function as the connection calculation executing part 4-11, and have a different flag value from one another. Since the connection control circuit 117 receives two kinds of input values from the intermediate layer, a logical product circuit, instead of the selector shown in FIG. 5, can serve as the connection control circuit 117. In the output neuron elements 310, 320, the number of ones of output intermediate layer outputs of connected synapses among the intermediate layer outputs are counted for integration.

The thus integrated output values of the output neuron elements 310, 320 are judged as to which is the largest so as to make an address of the output neuron element whose output value is the largest a recognition result.

The learning algorithm in the network system shown in FIG. 6 is discussed next.

First, all flag memories of synapses continuing to the output neuron elements are set to 0. Suppose that the intermediate layer output is not connected to the output neuron elements when the flag memory is 0 and is connected thereto when the flag memory is 1. Then, at the initial learning, learning is executed only one time to all of the data to be initial-learned. The learning method is that: 1 is set by a supervisor input in FIG. 6 to all values in the flag memories of synapses whose intermediate layer outputs are 1 among the synapses connected to the output neuron elements corresponding to the input data.

By employing the invention in the second embodiment and this embodiment, the connection control circuit 117 of the synapse to the output neuron elements is simplified and the integration processing which is executed in the output neuron elements 310, 320 is executed by counting the number of inputted values of 1, thus reducing the hardware size, compared with the circuit shown in FIG. 5.

Upon a test of recognition accuracy for unlearned data, about 2-3% lowering of recognition accuracy is caused compared with the circuits in first and second embodiments. However, the recognition accuracy is much higher than that in the conventional learning method, which means applicable into practice depending on a kind of data to be recognized.

Figure 7:
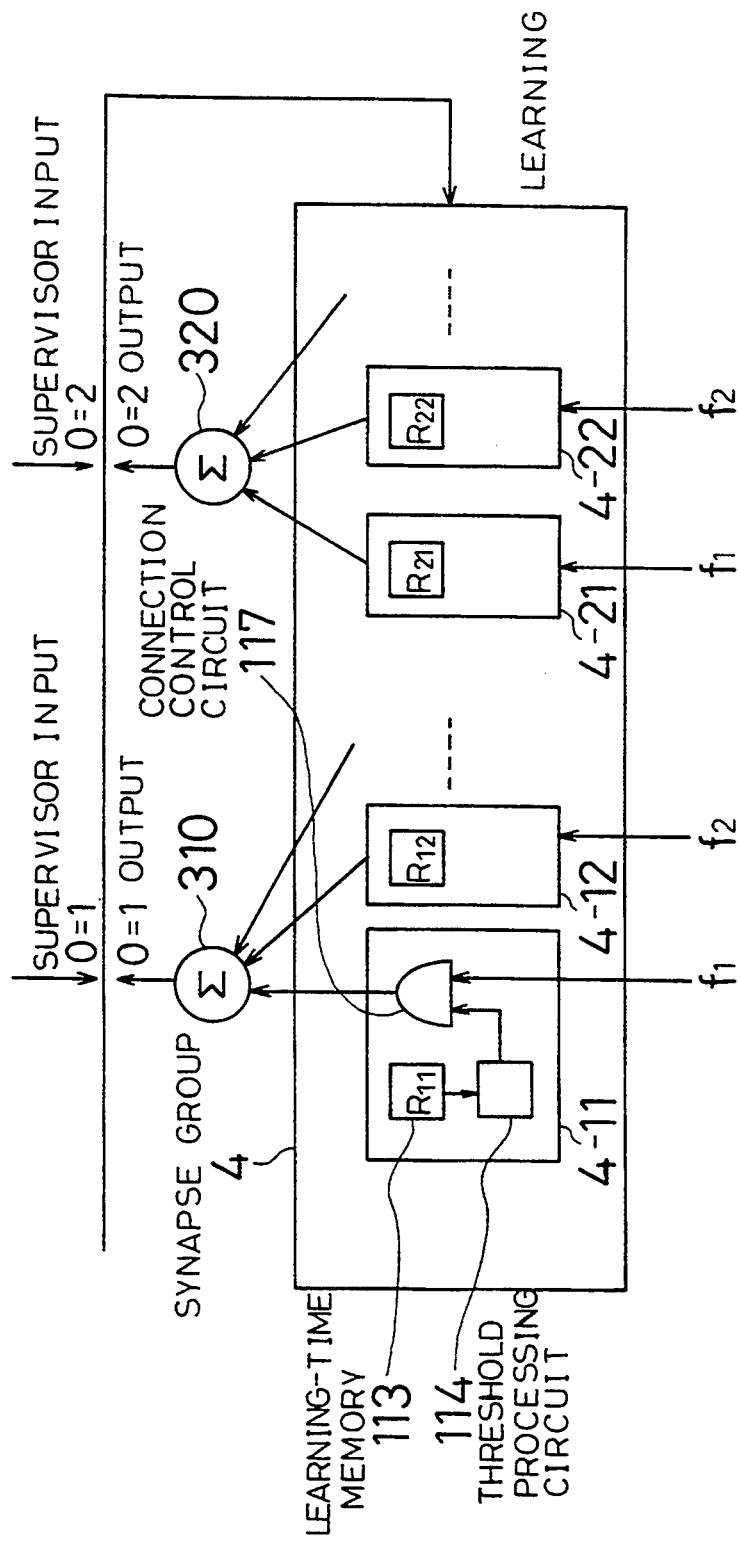
FIG. 7 is a diagram showing a construction of a neural network circuit in a fourth embodiment.
Figure 8:
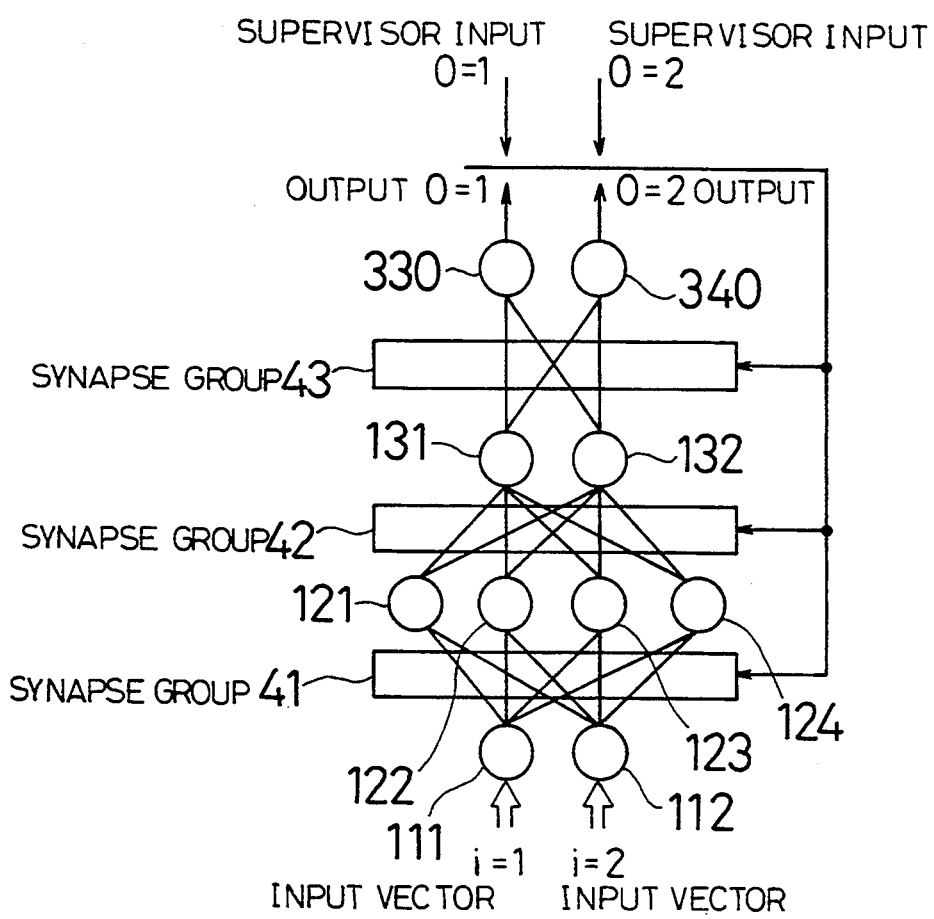
FIG. 8 is a diagram showing a construction of a conventional multi-layered network circuit.

FIG. 7 shows a neural network circuit according to a fourth embodiment of the present invention and corresponds to FIG. 1, so the same reference numerals as in FIG. 1 have been used for the same elements in FIG. 7.

In FIG. 7, reference numerals 310 and 320 are output neuron elements of the final layer for integrating the intermediate layer outputs of the neuron elements 11-31-11-38, 12-31-12-38 shown in FIG. 9. References f1 and f2 are, as mentioned in the conventional example, the intermediate layer output values of the neuron elements 11-31 and 11-32 in FIG. 9 respectively. In accordance with the above mentioned references, the neuron elements 11-31-12-38 are the branch points of an input signal, so that an output value from the neuron element 11-32 to the output neuron element 310 and an output value from the neuron element 11-32 to the output neuron element 320 are equal to each other and are indicated by f1. Wherein, in FIG. 7, the intermediate layer output values f1, f2 have two kinds of outputs, i.e. 1 and 0. The calculation of connection of the synapse to the output neuron elements is executed by the connection calculation executing parts 4-11-4-22.

The connection calculation executing part 4-11 is composed of the learning-time memory 113, the threshold processing part 114 for threshold-processing the learning-time memory 113 and the connection control circuit 117 to be controlled by the control signal of two kinds of values by the threshold processing circuit 114 for controlling the connection of synapse between the intermediate layer and the output neuron elements. The connection calculation executing parts 4-12-4-22 have the same function as that of the connection calculation executing part 4-11, and have a different learning-time value from one another. Since the connection control circuit 117 receives two kinds of values from the intermediate layer, a logical product circuit, instead of the selector shown in FIG. 1, can serve as the connection control circuit 117. In the output neuron elements 310, 320, the number of intermediate layer outputs of 1 of the connected for integration synapses is counted for integration among the intermediate layer outputs.

The thus integrated output values of the neuron elements 310, 320 are judged as to which is the largest so as to make an address of the output neuron element whose output value is the largest a recognition result.

According to the circuit shown in FIG. 6, the connection control circuit 117 of the synapse to the output neuron elements is simplified and the integration processing executed in the output neuron elements 310, 320 is executed by counting the number of input values of 1, thus reducing the hardware size, compared with the circuit shown in FIG. 1.

Similar to the circuit shown in FIG. 6, the recognition result for the unlearned data is about 2-3% lower than that in the first embodiment shown in FIG. 1 and that in the second embodiment shown in FIG. 5. However, the recognition accuracy thereof is much higher than that in the conventional learning method and the circuit is applicable into practice depending on a kind of data to be recognized. The circuit shown in FIG. 7 can prevent the lowering of the recognition accuracy for unlearned data due to excessive learning, as well as the circuit in FIG. 1.

In the above embodiments, each connection calculation executing part 4-11-4-22 requires a memory for memorizing a different learning value. However, the processing in each connection calculation executing part and the integration processing in the output neuron elements can be executed by using one or plural processing devices, sequentially exchanging the learning memories. Moreover, as described in this embodiment, the connection calculation executing parts may be provided at all synapses to the respective output neuron elements to execute parallel processing.

The two output neuron elements are discussed for the sake of simplicity, but the present invention is not limited to this example, and may have another number of outputs.

We claim:

1. A multi-layered neural network circuit provided with an input layer to which one or plural input vectors are inputted, an intermediate layer having networks in a tree-like structure whose outputs are determined by values of the input vectors, where the number of networks corresponds to the number of the input vectors of the input layer, and an output layer having one or plural output units for integrating all output values of the intermediate layer, said networks comprising a plurality of neurons each of which comprises an output coupled to each output unit of the output layer so as to form a plurality of paths between the intermediate layer and the output layer, the multi-layered neural network further comprising:

learning-time memories disposed in each of said paths so as to couple the outputs of the neurons of the intermediate layer with the output units, said learning-time memories operative for storing a learned number representing the number of time that an output value of the intermediate layer which is outputted to a corresponding path is equal to or more than a set value;

threshold processing circuits coupled to each of said learning-time memories, said threshold processing circuits having and set threshold value, and operative for outputting a first set value when the learned number which is stored in the corresponding learning-time memory is equal to or more than the threshold and outputting a second set value when the learned number which is stored in the corresponding learning-time memory is less than the threshold; and connection control circuits for connecting a path between the outputs of the neurons of the networks of the intermediate layer and the output units when an output of the corresponding threshold processing circuit is the first set value and disconnecting the path therebetween when the output of the corresponding threshold processing circuits is the second set value, wherein the output units sum the output values of the neurons of the networks of the intermediate layer connected by the connection control circuits.

2. The neural network circuit according to claim 1, further comprising upper limit clipping means for limiting the value of the learned number stored in the corresponding learning-time memory to a set upper limit.

3. The neural network circuit according to claim 1, further comprising:

learning-time updaters for subtracting a set value from the learned number stored in the corresponding learning-time memory; and lower limit clipping means for limiting to minimum value of the learned number to 0.

4. The neural network circuit according to claim 1, wherein the threshold processing circuits have a function of changing a threshold by a set value.

5. A multi-layered neural network circuit provided with an input layer to which one or plural input vectors are inputted, an intermediate layer having networks in a tree-like structure whose outputs are determined by values of the input vectors where the number of networks corresponds to the number of the input vectors of the input layer, and output layer having one or plural output units for integrating all output values of the intermediate layer, said networks comprising a plurality of neurons each of which comprises an output coupled to each output unit of the output layer so as to form a plurality of paths between the intermediate layer and the output layer, the multi-layered neural network further comprising:

flag memories disposed in each of said paths so as to couple the outputs of the neurons of the intermediate layer with the output units, said flag memories operative for learning that an output value of the intermediate layer which is outputted to the corresponding path was equal to or more than a previously set value and for outputting a set value upon learning and outputting another set value without learning; and connection control circuits for controlling connections and disconnection of the paths between the outputs of the neurons of the intermediate layer and the output units according to an output of the corresponding flag memory, wherein the output units sum the output values of the neurons of the intermediate layer connected by the corresponding connection control circuits.

6. The neural network circuit according to claim 1 or 5, wherein each output of the intermediate layer has two kinds of values of "HIGH and "LOW", and the output units count the number of "HIGH"s among the outputs of the intermediate layer connected by the connection control circuits.

* * * * *